(12) United States Patent
Swanson

(10) Patent No.: US 10,857,493 B2
(45) Date of Patent: Dec. 8, 2020

(54) FLUID EXTRACTOR DEVICE AND KIT

(71) Applicant: Wayne Arthur Swanson, Gilford, NH (US)

(72) Inventor: Wayne Arthur Swanson, Gilford, NH (US)

( * ) Notice: Subject to any disclaimer, the term of this patent is extended or adjusted under 35 U.S.C. 154(b) by 55 days.

(21) Appl. No.: 16/232,298

(22) Filed: Dec. 26, 2018

(65) Prior Publication Data

US 2019/0209953 A1    Jul. 11, 2019

Related U.S. Application Data

(60) Division of application No. 15/224,144, filed on Jul. 29, 2016, now abandoned, which is a continuation-in-part of application No. 14/487,531, filed on Sep. 16, 2014, now Pat. No. 9,415,472.

(60) Provisional application No. 61/879,008, filed on Sep. 17, 2013.

(51) Int. Cl.
*B01D 35/16* (2006.01)
*B01D 35/31* (2006.01)

(52) U.S. Cl.
CPC .......... *B01D 35/16* (2013.01); *B01D 35/31* (2013.01)

(58) Field of Classification Search
CPC ......... F16L 33/04; F16L 33/08; F16L 33/085; F16L 33/06; F16L 33/065; F16L 33/045; F16L 33/03; F16L 33/035; B01D 35/16; B01D 35/31; B09B 3/0058; B25B 13/52
See application file for complete search history.

(56) References Cited

U.S. PATENT DOCUMENTS

| | | | | |
|---|---|---|---|---|
| 2,042,263 A | * | 5/1936 | La Valley | F16L 33/04 24/279 |
| 2,157,309 A | * | 5/1939 | Swedman | A47B 57/50 248/243 |
| RE24,199 E | * | 8/1956 | McDonald | F16L 41/045 137/318 |
| 2,827,913 A | * | 3/1958 | Wagner | F16K 13/04 137/318 |
| 3,554,217 A | * | 1/1971 | Ehrens | F16L 41/06 137/318 |
| 3,756,261 A | * | 9/1973 | Minchhoff | F16L 41/06 137/15.14 |
| 3,995,655 A | * | 12/1976 | Sands | F16L 41/06 137/318 |
| 4,140,155 A | * | 2/1979 | Tannery | F16L 41/065 137/318 |
| 5,558,140 A | * | 9/1996 | Clark, II | B09B 3/0058 141/329 |
| 5,560,388 A | * | 10/1996 | Caldwell | F16L 41/06 137/15.15 |
| D424,414 S | * | 5/2000 | Ziaylek | D8/373 |
| 2005/0211024 A1 | * | 9/2005 | Shpakow | G01M 3/3272 81/3.43 |
| 2016/0069513 A1 | * | 3/2016 | Knoll | B01D 35/16 137/15.14 |

* cited by examiner

*Primary Examiner* — Andrew D Stclair
(74) *Attorney, Agent, or Firm* — Michael J. Persson; Catherine E. Napjus; Chisholm Persson & Ball PC

(57) ABSTRACT

A fluid extractor device including a ring with a circumference capable of fitting around an oil filter; a bracket affixed to the ring; and a valve including a base attached to the bracket, an extendable pin extending through the base, and a vacuum extension extending perpendicularly from the base and terminating in a vacuum aperture.

3 Claims, 18 Drawing Sheets

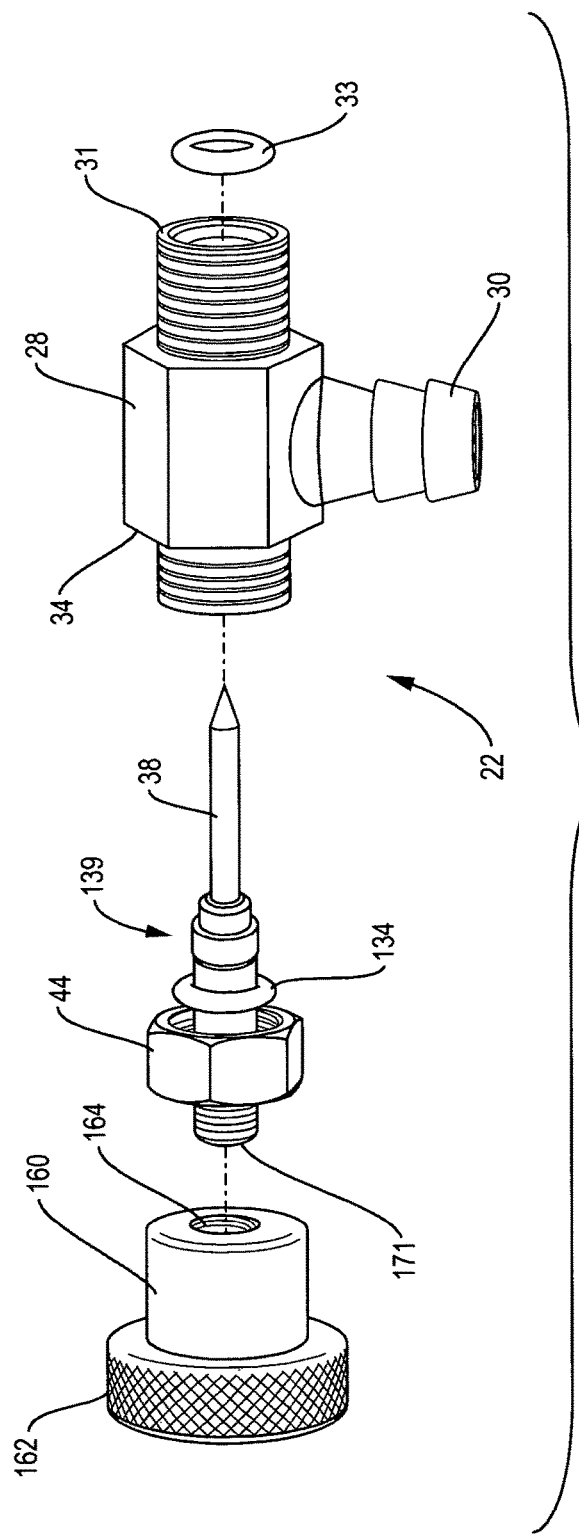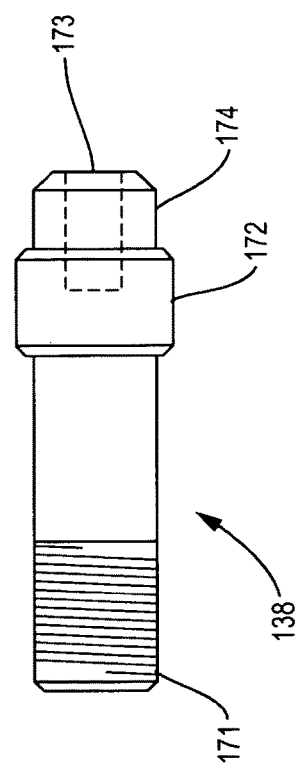
FIG. 15B
FIG. 15C

FLUID EXTRACTOR DEVICE AND KIT

CLAIM OF PRIORITY

This application is a divisional application claiming the benefit of co-pending U.S. patent application Ser. No. 15/224,144, filed on Jul. 29, 2016, which claims the benefit of U.S. patent application Ser. No. 14/487,531, filed on Sep. 16, 2014, which issued as U.S. Pat. No. 9,415,472 on Aug. 18, 2016, which claimed the benefit of priority of U.S. Provisional Patent Application Ser. No. 61/879,008, filed on Sep. 17, 2013.

FIELD OF THE INVENTION

The present invention relates to fluid extractors and, specifically, to an improved fluid extractor device and systems adapted for removing oil from oil filters.

BACKGROUND

Oil filters are used the world over in oil lubrication systems for automobiles, boats, and other motor vehicles. Oil filters are used to filter dirt and other contaminants and/or detritus from the oil used in the oil lubrication systems. Periodically, the oil and oil filters in these systems are changed. The oil is drained from the system and the oil filter is removed and replaced with a new oil filter. Even after draining, however, the old oil filters still hold some remaining oil. The old oil filters therefore must be carefully handled to avoid spilling the remaining oil. When it does spill it is messy and difficult to clean up. In particular, in boats, the remaining oil can get into the bilge systems and from there pumped into bodies of water, causing pollution. In addition, the remaining oil in the oil filters means that the oil filters will require special hazardous material handling before disposal or recycling. Therefore there is a need for the clean, safe, and complete removal of oil from a used oil filter.

At least one product exists that begins to address this need. The invention disclosed in U.S. Pat. No. 8,002,002 discloses a fluid filter draining device for draining fluid from a fluid container, such as an oil filter, in a controlled manner. An engagement ring is frictionally engaged on the outer sidewalls of a fluid filter. The engagement ring carries a threaded screw with a sharpened tip and a channel communicating between an opening at a forward end of the screw and a rear region of the threaded screw. When the screw is turned it penetrates the sidewall of the fluid container and enters the fluid containing cavity of the filter. Fluid is drained through the channel in the drill tip and out through an associated swivel hose connection and swivel hose to a collection container. This arrangement has several drawbacks that make it not work very well. The sharpened tip of the threaded screw, for example, is large and difficult to puncture through the metal of the oil filter. In addition, once the oil filter is punctured, oil is able to flow through the channel immediately and there is no way to curb the flow. Thus if an appropriate receptacle is not already in place at that time, the oil flow will make a mess. Finally, the pieces of the assembly require special machining making the assembly difficult to manufacture and expensive.

Therefore there is a need for a fluid extractor for removing oil from an oil filter that uses simple off-the-shelf pieces in an assembly used to easily puncture an oil filter so that the oil will only flow out when the user is ready for it to do so.

SUMMARY OF THE INVENTION

The present invention is a fluid extractor device for removing oil from an oil filter and a fluid extractor kit.

In its most basic form, the fluid extractor device of the present invention includes a ring, a bracket attached to the ring, and a valve attached to the bracket. The ring has a ring circumference capable of fitting around an oil filter circumference of an oil filter and a ring clamp disposed on the ring that is capable of reducing the ring circumference so that the ring is tightly held against the oil filter. The valve includes a base with a bracket side and a pin side, where the bracket side extends through the bracket so that the valve and the bracket are held in place relative to one another. The valve also includes a pin with a pointed end and a screw end. The pin extends through the base with the screw end of the pin extending beyond the pin side of the base. Through turning the screw end of the pin, the pointed end of the pin is capable of being disposed entirely within the base or extending beyond the bracket side of the base. Finally, the valve also includes a vacuum extension extending perpendicularly from the base and terminating in a vacuum aperture. The vacuum extension is sized and dimensioned to securely attach a vacuum hose around the vacuum extension.

The ring of the device is preferably round and sized to fit around the circumference of a standard oil filter. This circumference is therefore preferably approximately four to five inches. The ring is preferably made of a rigid but malleable metal, such as steel or aluminum. The ring also preferably includes a tightening screw where the tightening screw can expand or retract the circumference of the ring by screwing or unscrewing the tightening screw. Finally, in some embodiments, the ring does not form a complete circle, but rather that the circumference of the ring is interrupted by the bracket. The bracket is attached to the ring by bridging the gap in the ring. In this embodiment, the bracket preferably includes bracket screws on either side of the bracket, which attach the bracket to the ring on both sides.

The valve of the device is preferably a standard saddle valve, such as those used, for example, in connecting ice maker lines to household refrigerators. The preferred valve is easily acquired off-the-shelf and requires no special machining by the end user. The valve has a base through which the pin extends and a vacuum extension perpendicular to the base. The vacuum extension terminates in a vacuum aperture around which the hose end of a vacuum pump may be applied. When the vacuum pump is activated, oil is sucked out of an oil filter to which the device has been applied. The vacuum extension preferably includes ridges for easy, secure attachment of a rubber hose, as part of the vacuum equipment. The entire valve swivels around the bracket side of the base of the valve so that the valve may be moved for most convenient rubber hose and vacuum attachment. The bracket screws on either side of the bracket preferably act as stops so that the valve cannot swivel all the around, but is limited to swiveling across approximately a 180° span.

The preferred base of the valve has a bracket side and a pin side. The bracket side of the base includes a compressible ring and is held in place against the oil filter. The pin runs through the base of the valve and may be extended, so as to pierce the outer wall of an oil filter, or retracted, so as to allow oil to flow out of a pierced oil filter, within the base. Regardless of the position of the pin, the screw end of the pin always extends out of the pin side of the base so that the pin may be maneuvered. The pin is threaded so that it may be extended and retracted and is connected to the pin side of the base of the valve through a bolt.

In practice, the ring is placed around the oil filter and the tightening screw is tightened so that the ring fits snugly and securely around the oil filter circumference. The screw end of the pin is then turned until the pointed end of the pin punctures the oil filter. The pin moves through the base of the valve during this turning. While the pin is in the position where it has punctured the oil filter and not yet been retracted, oil cannot yet escape the oil filter, therefore avoiding messy oil spills or spurts from the newly formed hole in the oil filter. As the pin is retracted by turning the screw end of the pin in the opposite direction, oil may now flow out of the oil filter into the base of the valve and then through the vacuum extension and out of the vacuum aperture of the valve. As the spaces through which the oil may flow, such as the base and vacuum extension of the valve, are small, vacuum is applied at the vacuum aperture so that the oil is easily and cleanly sucked out of the oil filter. The oil filter is then clean and oil-free, and may be disposed of or recycled without additional treatment or hazardous materials concerns. The oil is also collected for easy disposal or reuse.

In a preferred embodiment of the device of the present invention, the bracket does not interrupt the ring circumference and bridge that gap. Instead, the bracket has a left side, a right side, and a center side. The center side connects the right and left side at their tops so that the bracket looks approximately like a rectangle missing one side. The left and right sides are parallel to one another and the distance between them is just larger than the diameter of the ring so that the ring is attached to the left and right sides of the bracket on either side at ring-bracket affixation points. The bracket has a uniform width across the left, right, and center sides. Within this width are disposed a number of valve holes at various places along the sides of the bracket. The valve is attached to the bracket through any of these valve holes. The valve holes have threading that corresponds to threading on the bracket side of the base of the valve so that the valve may be screwed into any of the valve holes. The center side of the bracket is preferably slightly rounded so as to follow the line of the top of an oil filter. It is preferred that the bracket also include right and left buffers, which are small space fillers that take up the room between the bracket and the oil filter when the oil filter is in place. This ensures that the oil filter sits solidly within the device without wiggling during the oil removal process.

In a preferred embodiment of the device of the present invention, the ring includes an outer overlap portion and an inner overlap portion, each with an end. The outer and inner overlap portions are portions of the ring that overlap one another so that a portion of the ring circumference includes the outer overlap portion flush against the inner overlap portion. As the ring circumference is adjusted by the ring clamp, the outer and inner overlap portions move with relation to one another. When the ring circumference is smaller, the ends of the outer and inner overlap portions will be farther away from one another. When the ring circumference is larger, the ends of the overlap portions will be closer together.

Also in this preferred embodiment, the ring clamp includes a threaded piece and a sleeve. The threaded piece includes threading across at least a portion of its length. On one end, the threaded piece ends in a T-bar. The threaded piece also has another end. The sleeve includes a threaded hollow. The threading of the sleeve's threaded hollow and the threaded piece are designed to mate, and the threaded hollow is sized and dimensioned so that the threaded piece may be screwed into the threaded hollow. The threaded hollow is surrounded by inner and outer sleeves. The outer sleeve ends in a T-bar with a hole in it. The inner sleeve ends in a threaded bolt with a hole in it. The threaded hollow is exposed through the T-bar hole and the bolt hole. The threaded piece is designed for the non-T-bar end of the threaded piece to be introduced to the threaded hollow through the T-bar hole and screwed all the way through the threaded hollow so that the non-T-bar piece of the threaded screw then extends out of the other side of the sleeve through the bolt hole. The inner sleeve is designed to be able to move in and out of the outer sleeve. How far the inner sleeve extends into the outer sleeve is dependent on how far along the threaded piece the bolt is screwed.

Also in this preferred embodiment, the ring includes and outer overlap hook and an inner overlap hook. These hooks are affixed to the ring at one end and then curve up and out from the ring to form a loop that then extends back toward the ring and may be back in contact with ring. The hooks each include a gap, which accommodates the T-bar of the threaded piece and the outer sleeve's T-bar. The rounded portions of the hooks face one another. The T-bar of the threaded piece is disposed within the inner overlap hook. The T-bar of the outer sleeve is disposed within the outer overlap hook. Both of the T-bars and both of the hooks are rounded so that although the cross bar of the T-bars are held firmly within the hooks, they may also rotate as small adjustments are made when the bolt is moved along the threaded piece to expand or reduce the ring circumference. The hooks may be affixed to the ring by welding, screws, or any other manner commonly used in the art.

It is preferred that this embodiment also include an overlap lip. This lip is a part of the inner overlap lip and extends up so that the outer overlap lip moves within the lip and is guided by it during this movement. It is also preferred that the non-T-bar end of the threaded piece include a cap. This may be a rubber cap and terminates the thread so that it is not sharp to the touch for a user.

In one embodiment, the fluid extractor kit of the present invention includes either embodiment of the device of the present invention in combination with a vacuum pump with a hose end for attachment to the vacuum extension of the valve device. In another embodiment, the kit includes a single valve and multiple brackets sized to fit around oil filters of different sizes.

Therefore it is an aspect of the present invention to provide an inexpensive, easy-to-use device for cleanly removing oil from a used oil filter.

It is a further aspect of the present invention to provide a device that can be adjusted in size to fit snugly around any round oil filter.

It is a further aspect of the present invention to provide a device that punctures an oil filter but will not release the oil through the hole created by the puncture until a time chosen by the device user.

It is a further aspect of the present invention to provide a device that may be attached to a vacuum in the most convenient of several positions.

It is a further aspect of the present invention to provide a device that requires only one simple tool for operation of several device features.

It is a further aspect of the present invention to provide a device assembled from inexpensive off-the-shelf components.

It is a further aspect of the present invention to provide a device easily attachable to a hose and vacuum.

These aspects of the present invention are not meant to be exclusive and other features, aspects, and advantages of the present invention will be readily apparent to those of ordi-

BRIEF DESCRIPTION OF THE DRAWINGS

FIG. 15B is an assembly view of the preferred valve of FIG. 15A with the valve plug and pin visible.

FIG. 15C is a side view of the preferred valve plug shown in FIG. 15B.

DETAILED DESCRIPTION

Figure 1A:
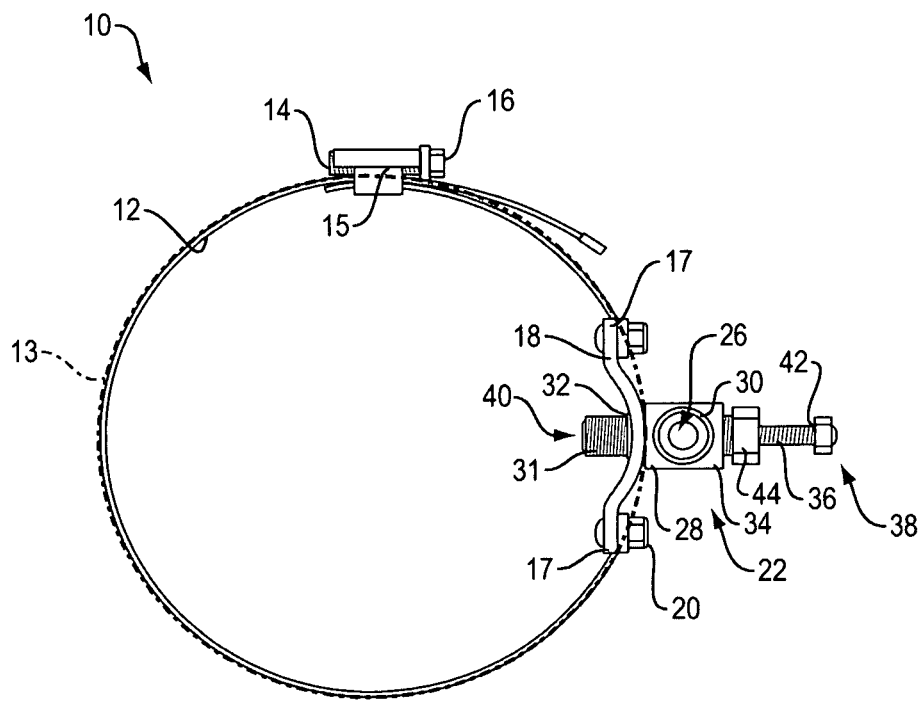
FIG. 1A is a top down view of the fluid extractor device of the present invention.
Figure 1B:
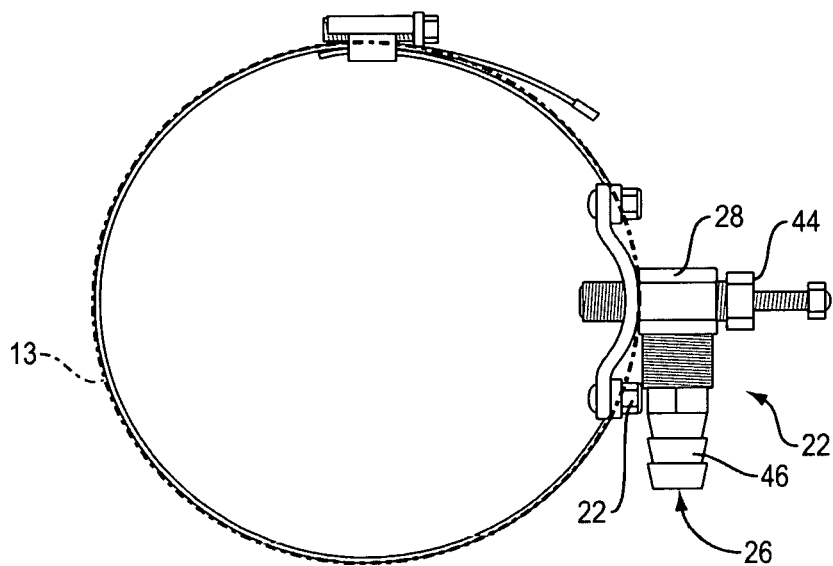
FIG. 1B is an alternative top down view of the device of the present invention with the valve swiveled in a different position.
Figure 7:
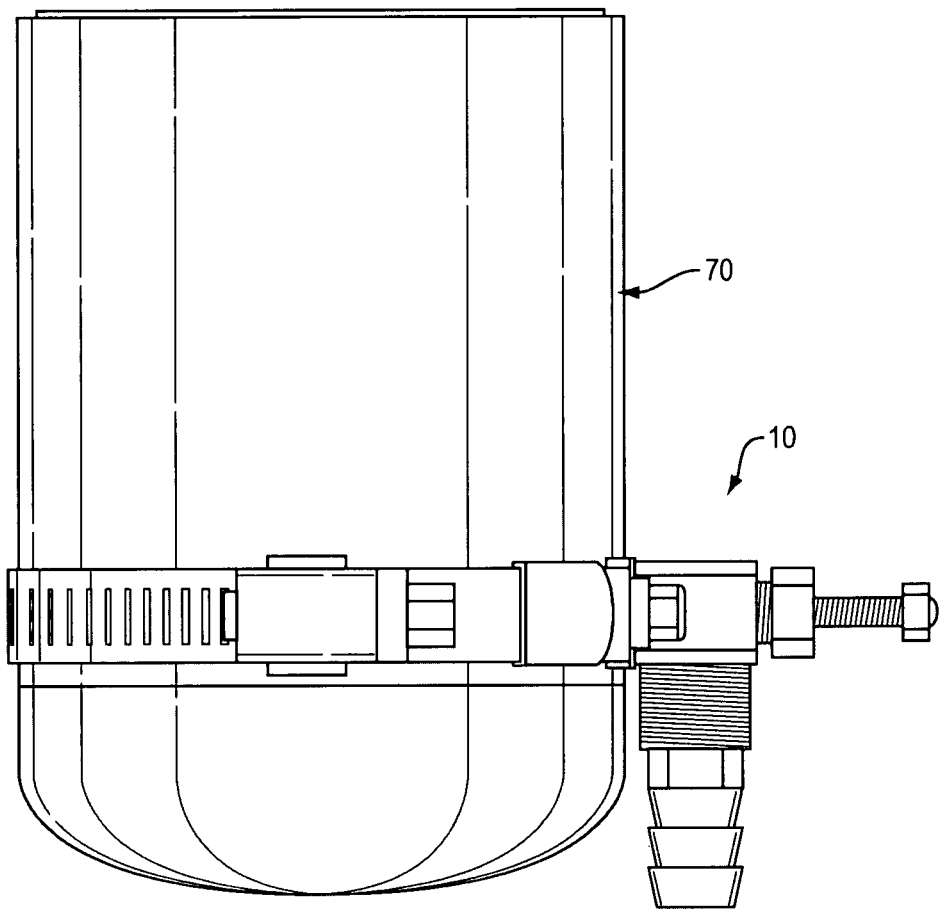
FIG. 7 is a side view of the device of the present invention attached to an oil filter.

Referring first to FIGS. 1A and 1B, top down views of fluid extractor device 10 are provided. In each view, we see ring 12 with ring clamp 15 and ring circumference 13; bracket 18; valve 22; and pin 38. Bracket 18 interrupts ring 12 so that bracket 18 is a part of ring circumference 13. Ring 12 is the preferred hose clamp ring. Ring clamp 15 includes the preferred tightening screw 14 and screw head 16. Bracket 18 has bracket screws 20 on either side at ring-bracket affixation points 17. Although bracket screws 20 are the preferred method to affix ring 12 and bracket 18 together, it is understood that ring 12 and bracket 18 may be affixed by any means commonly used in the art, such as welding. Although bracket screws 20 are indicated from the inside of ring 12, it is understood that bracket screws 20 extend through ring 12 and are therefore disposed on both sides of ring 12. Valve 22 has base 28 and vacuum extension 30 perpendicular to base 28. Base 28 has bracket side 32 that extends through bracket 18 and exposed side 34 out of which pin 38 extends. Bracket side 32 terminates in a compressible ring 33. Bracket side 32 includes base bracket side threading 31. Pin 38 includes pointed end 40 and screw end 42. Pointed end 40 is not visible in this view as it is within base 28. When pin 38 is extended by turning screw end 42 using threading 36, pointed end 40 will extend out of base 28 and puncture an oil filter (as shown in FIG. 7, for example) positioned within ring 12. Pin 38 is held in place within base 28 by compression nut 44. Vacuum extension 30 has vacuum aperture 26. Ridges 46 around the outside of vacuum extension 30 allow for easy attachment of a vacuum hose and vacuum device (shown in FIG. 8). In FIG. 1B, we see valve 22 swiveled to one side as opposed to perpendicular to ring 12, as shown in FIG. 1A. Valve 22 is also capable of swiveling in the opposite direction from that shown. Bracket screws 20 act as stops so that valve 22 cannot completely revolve, but may swivel within the approximate 180° arc. The swiveling allows a vacuum hose 92 and vacuum pump 94 to be attached at whatever is the most convenient position within that arc.

Figure 2A:
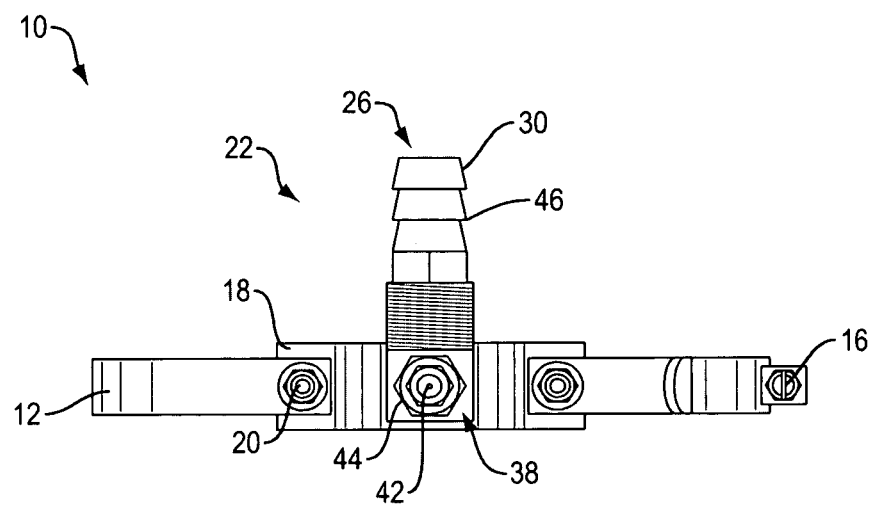
FIG. 2A is a side view of the device of the present invention centered on the bracket and valve.
Figure 2B:
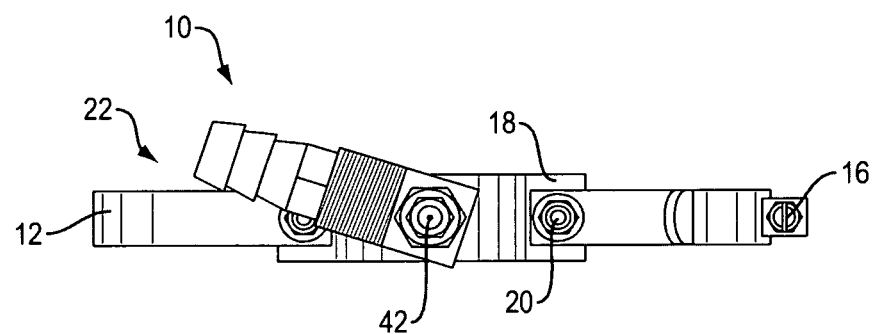
FIG. 2B is an alternative side view of the device of the present invention centered on the bracket and valve with the valve swiveled in a different position.

Now referring to FIGS. 2A and 2B, side views of device 10 centering on bracket 18 and valve 22 are provided. Bracket 18 is shown with bracket screws 20 on either side. Screw head 16 of tightening screw 14 is visible on the right. Vacuum extension 30 and ridges 46 are visible on valve 22. Screw end 42 of pin 38 is visible, as is compression nut 44 holding pin 38 in position within base 28 of valve 22. As with FIGS. 1A and 1B, valve 22 is shown swiveled in different positions in FIGS. 2A and 2B. In FIG. 2B, bracket screw 20 is acting as a stop from valve 22 swiveling any further.

Figure 3:
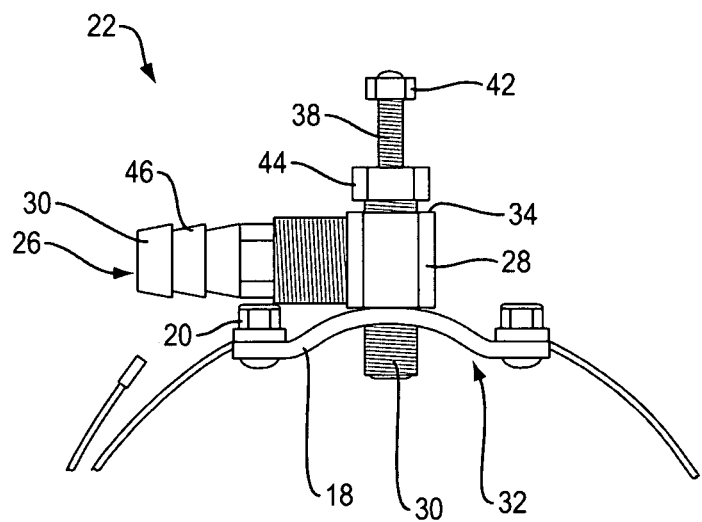
FIG. 3 is a side view of the bracket and valve of the device of the present invention.

Now referring to FIG. 3, a side view centering on bracket 18 and valve 22 is provided. Valve 22 is swiveled to the side and stopped by bracket screw 20. Valve 22 has vacuum extension 30 with vacuum aperture 26. Valve 22 also has base 28 with bracket side 32 and exposed side 34. Pin 38 extends out of exposed side 34 of base end 28 of valve 22 and is held in place by compression nut 44.

Figure 4:
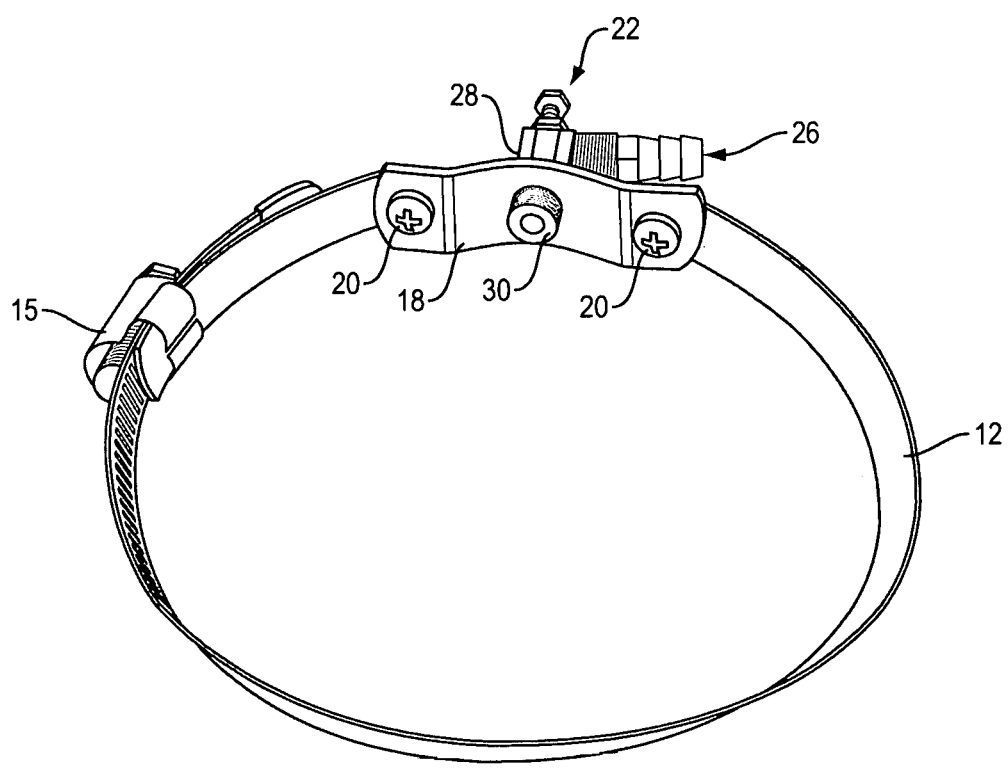
FIG. 4 is a perspective view of the device showing the bracket and valve with the pin in a retracted position.

Now referring to FIG. 4, a perspective view of the inside of device 10 is shown in which the ring 12, the inside of the bracket 18, and valve 22 are visible. The aperture in the bracket side 32 of the base 28 of valve 22 is visible within the inside of the compressible ring 33. In this view, the pointed end 40 of pin 38 is disposed within this aperture. Base bracket side threading 31 used to screw valve 22 into bracket 18 through valve hole 37 in bracket 18 (not visible because valve 22 is filling valve hole 37 in this view) is also visible. Although not visible in this view, it is understood that the sides of valve hole 37 also include valve threading that coordinates with base bracket side threading 31 to secure valve 22 through bracket 18. FIG. 10D shows the pointed end 40 of the pin 38 in an extended position. In this position, the pointed end 40 of the pin 38 will pierce the side of an oil filter, such as the oil filter 70 of FIG. 7. Once the pointed end 40 of the pin 38 pierces the side of the oil filter, it is retracted to the position shown in FIG. 4A to allow oil to flow through the opening in the oil filter created by the pin 38.

Figure 5:
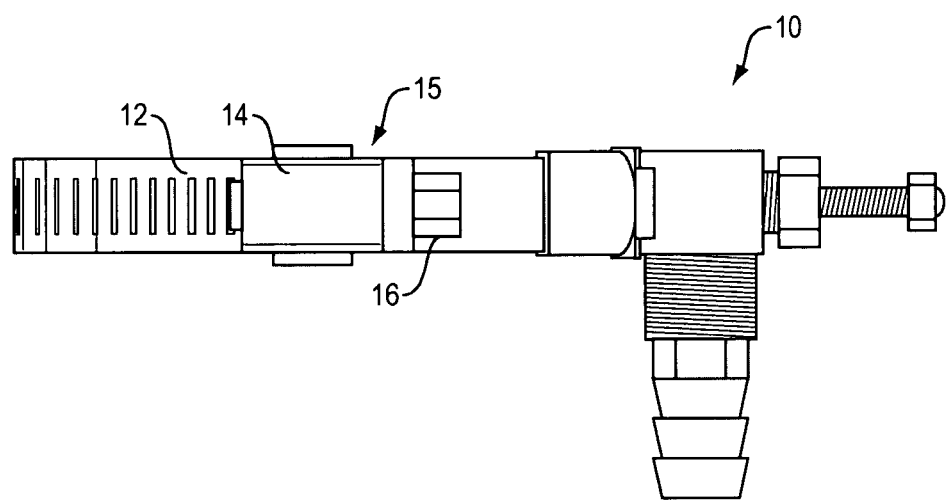
FIG. 5 is a side view of the device of the present invention centering on the tightening screw.

Now referring to FIG. 5, a side view of device 10 centered on tightening screw 14 is provided. The rounded metal that forms ring 12 is longer than the circumference of the circle formed by ring 12. The extra length is threaded through tightening screw 14 and is visible to the right of tightening screw 14 with the end of the extra length covered with rubber so as to avoid sharp end pieces. When tightening screw 14 is loosened or tightened, the material of ring 12 may move within tightening screw 14 so that the circumference of ring 12 is made smaller or larger to accommodate the circumference of the oil filter. When the desired circumference is achieved, the screw head 16 is tightened so that ring 12 is held snugly and securely around the circumference of the oil filter to be drained.

Figure 6A:
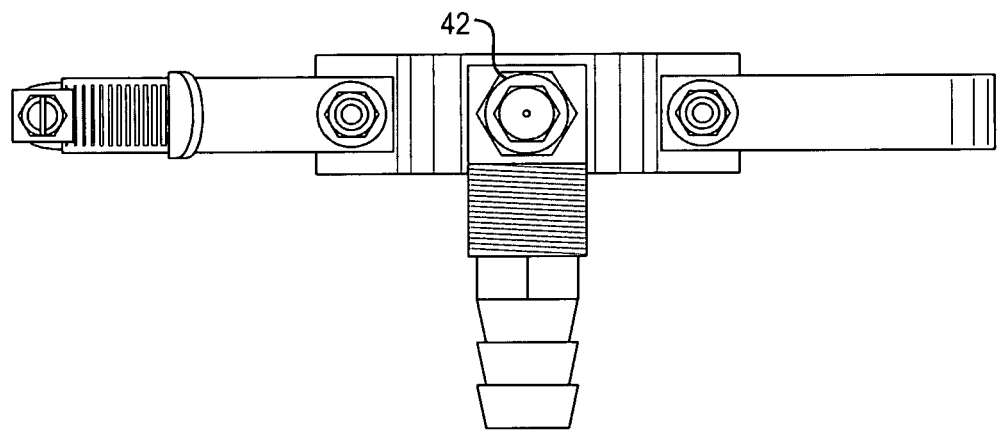
FIG. 6A is a close up view of the screw end of the pin.
Figure 6B:
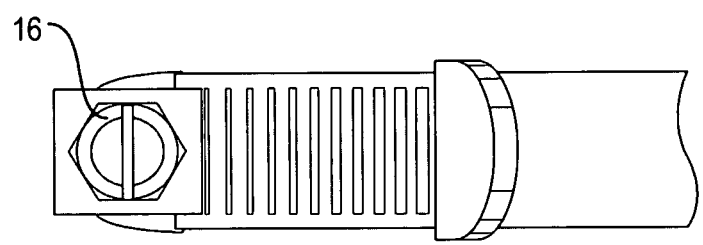
FIG. 6B is a close up view of the tightening screw.

Now referring to FIGS. 6A and 6B, close ups of screw end 42 of pin 38 and tightening screw 16 are provided, respectively. The hexagonal sides of screw end 42 and tightening screw 16 are of the same shape and size so that only one sized wrench is necessary to operate each of these features of device 10.

Figure 8:
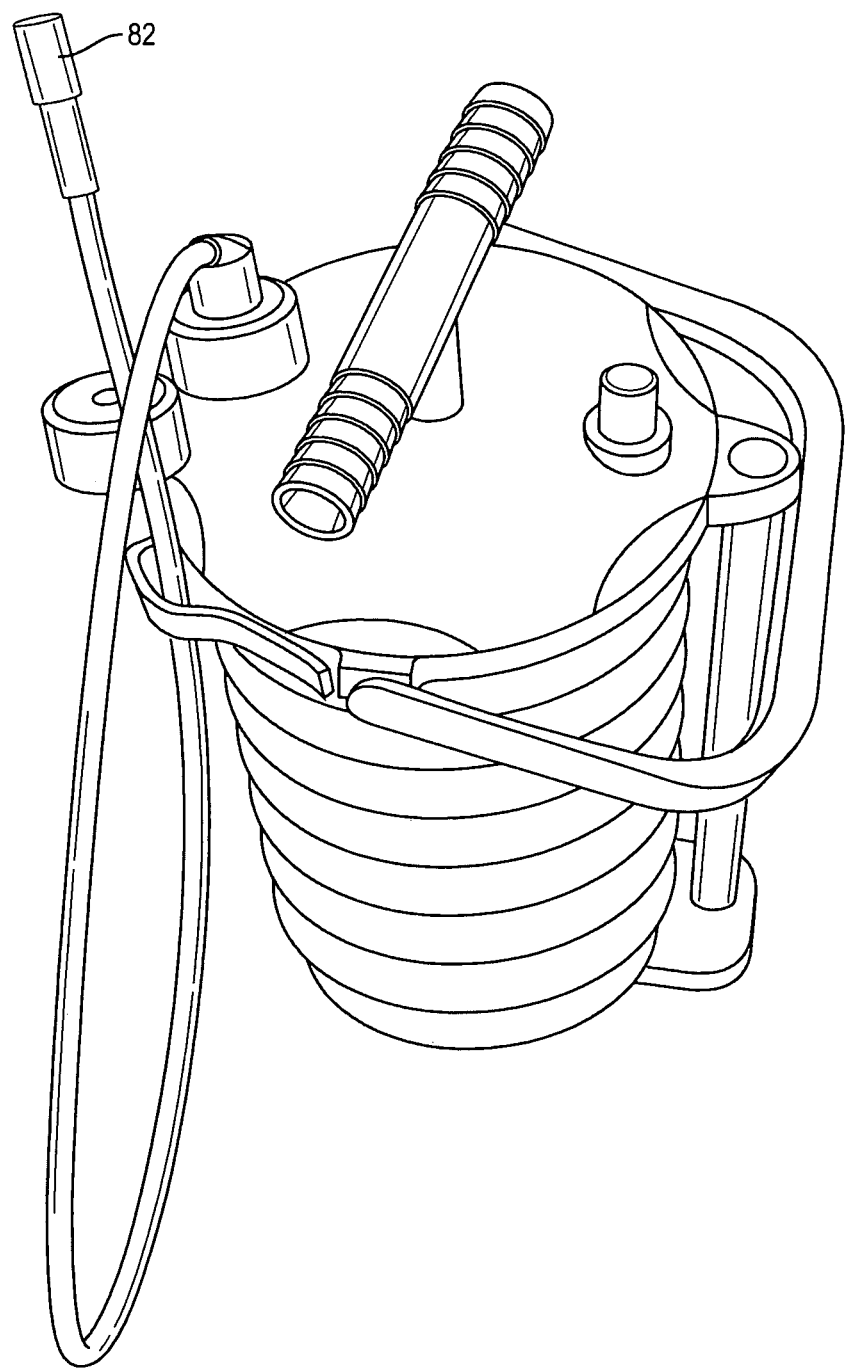
FIG. 8 is a side view of a vacuum pump that is attached to the device to form the fluid extractor kit of the present invention.

FIG. 7, shows the device 10 mounted around an oil filter 70. FIG. 8 shows a vacuum pump 94 that includes a hose end 92 that attaches to vacuum extension 30 of the device 10. The device 10 and vacuum pump 94 are combined to form the preferred fluid extractor kit of the present invention.

Figure 9A:
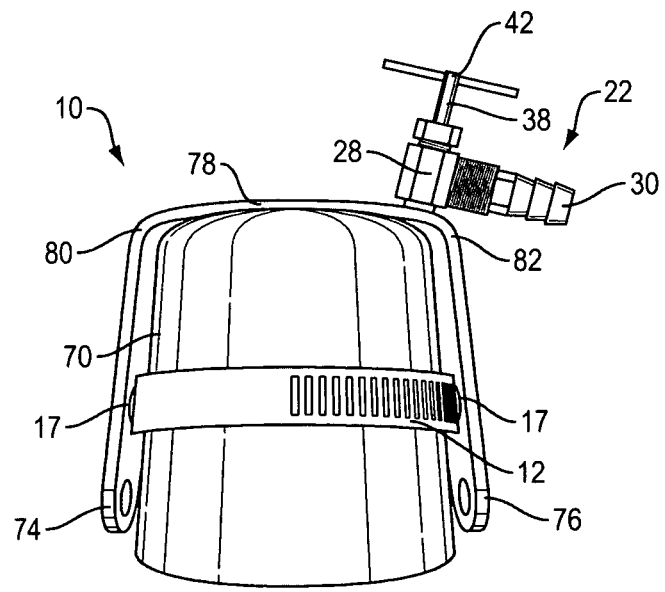
FIG. 9A is a side view of a device of the present invention mounted on an oil filter.
Figure 9B:
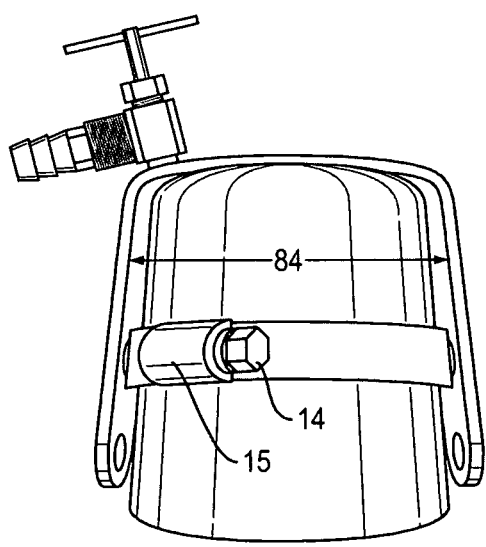
FIG. 9B is the other side view of the device shown in FIG. 9A.

Now referring to FIGS. 9A and 9B, side views of the preferred embodiment of device 10 are provided. The main difference between the embodiment described with respect to FIGS. 1-7 and this preferred embodiment is that bracket 18 is not a part of ring circumference 13 of the ring 12 (shown in FIG. 11E). Instead, bracket 18 includes left side 74, right side 76, and center side 78 connecting left and right side 74, 76 at their tops 80, 82. Like ring 12, bracket 18 is placed around oil filter 70 so that left and right sides 74, 76 are parallel and on either side of oil filter 70 and center side 78 extends over the top of oil filter 70. Center side 78 is preferably curved slightly convex away from left and right sides 74, 76, as shown, in order to better follow the lines of the top of oil filter 70. Valve 22 is as described above with the embodiment described in FIGS. 1-7. Valve 22 is shown here with a handle at the screw end 42 of pin 38. This is for ease of turning screw end 42 in order to extend and retract pointed end 40 (shown in FIG. 10D) in order to puncture oil filter 70. Left and right sides 74, 76 are sized to have a length and a spacing to allow it to fit around an oil filter 70 of a given size. Accordingly, the length and spacing will vary depending upon the oil filter 70 and certain embodiments of the kit include multiple brackets 18 having left and right sides 74, 76 of varying lengths and spacings.

Bracket side 32 of base 28 of valve 22 is positioned through a valve hole 37. Bracket 18 includes several valve holes 37 positioned on left, right, and center sides 74, 76, 78 (shown more clearly in FIGS. 11A-C, E), so that valve 22 may be positioned at several places around oil filter 70. Bracket side 32 of base 28 of valve 22 includes base bracket side threading 31, which corresponds with the valve threading on the inside of each valve hole 37, so that valve 22 may be affixed to bracket 18 at any of these valve holes 37. Distance 84 between left and right sides 74, 76 is just larger than the diameter of ring 12 so that ring 12 may be attached to left and right sides 74, 76 at ring-bracket affixation points 17. This affixation may be by welding or screws or any other method commonly used in the art.

Figure 10A:
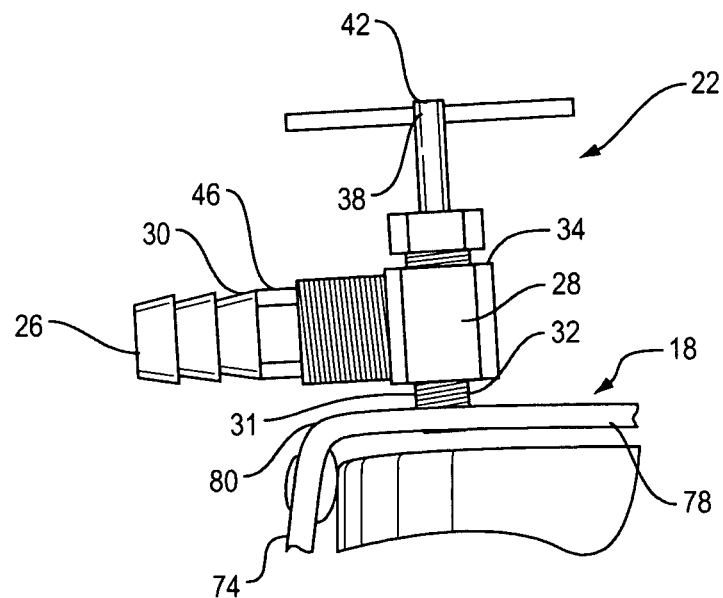
FIGS. 10A and 10B are detailed views of the valve and bracket of the present invention with the bracket side of the base of the valve apart from and flush against an oil filter, respectively.
Figure 10B:
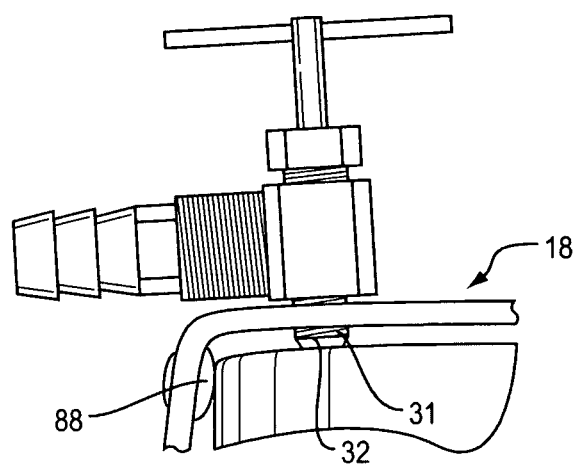
Figure 10C:
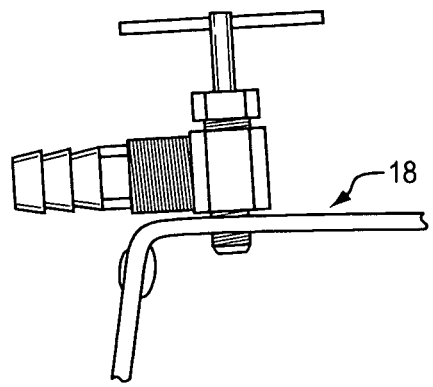
FIGS. 10C and 10D are detailed views of the valve and bracket of the present invention with the pin retracted and extended, respectively.
Figure 10D:
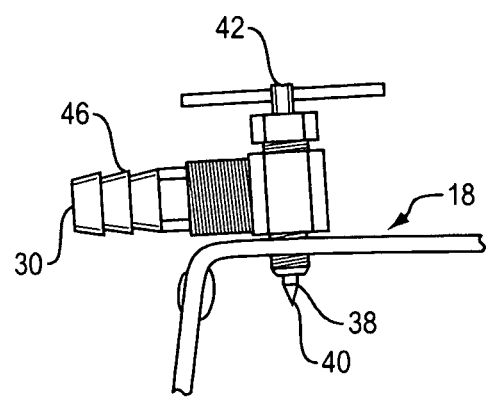

Now referring to FIGS. 10A-10D, close up views of the intersection of valve 22 and bracket 18 are provided. In FIGS. 10A and 10B, oil filter 70 is included in the figure. Base bracket side threading 31 of bracket side 32 of base 28 of valve 22 is screwed into valve threading of valve hole 37 of bracket 18. In FIGS. 10A-10D, the valve hole 37 into which valve 22 is disposed is on center side 78. It is understood that valve 22 may be disposed in any of the valve holes 37, which are better viewed in FIGS. 11A-C, E. This allows oil filter 70 to be drained in situ, regardless of its orientation in situ. Left buffer 88 is also visible on the inside of left side 74 of bracket 18. It is understood that right side 76 also includes a similar right buffer 90. Buffers 88, 90 hold oil filter 70 in place, as shown. Taking up the space between left and right sides 74, 76 and oil filter 70 decreases the wiggle room of oil filter 70 so that the oil removal process goes more smoothly.

In FIG. 10A, device 10 has just been placed around oil filter 70. Although it is not shown in this view, it is understood that ring 12 has been tightened around oil filter 70 using ring clamp 15 so that device 10 is held securely in place on oil filter 70. In FIG. 10B, valve 22 has been screwed farther into bracket 18 so that bracket side 32 of valve 22 is flush against oil filter 70. This is the same position that valve 22 is in FIG. 10C, but oil filter 70 has been removed for illustrative purposes. In FIG. 10D, the handle at the screw end 42 of pin 38 has been turned so that pointed end 40 of pin 38 has extended out of bracket side 32 of valve 22. Although the oil filter 70 has been removed so that this pointed end 40 is visible, it is understood that if oil filter 70 were still in place, oil filter 70 would be punctured. The hose end 92 of a vacuum pump 94, such as that shown in FIG. 8, may then be applied around vacuum extension 30 of valve 22. Ridges 46 help to hold hose end 92 in place. Pin 38 would then be again retracted by turning screw end 42 of pin 38 back in the other direction. At that point, when the vacuum is applied by the vacuum pump 94, any remaining oil left in oil filter 70 will be removed through valve 22 and vacuum hose 92.

Now referring to FIGS. 11A-11E, top down, left side, right side, bottom up, and perspective views of the device 10, respectively, are provided. These views show that, in addition to the valve hole 37 into which valve 22 is shown disposed in the figures, device 10 includes several other valve holes 37 on the left, right, and center sides 74, 76, 78 into which valve 22 may be disposed. In addition, we see width 86 of left, right, and center sides 74, 76, 78 and buffers 88, 90 from the outside of bracket 18, as opposed to the inside, as we saw them in FIGS. 10A-10D. Oil filter circumference 72 is shown emboldened in FIG. 11D and ring circumference 13 is shown emboldened in FIG. 11E. The ring circumference 13 is capable of fitting around oil filter circumference 72 with little slack. What slack may remain once ring 12 is placed around oil filter 70 is removed by tightening ring clamp 15 so as to reduce ring circumference 13 until ring 12 is tightly held against the oil filter 70.

Figure 11A:
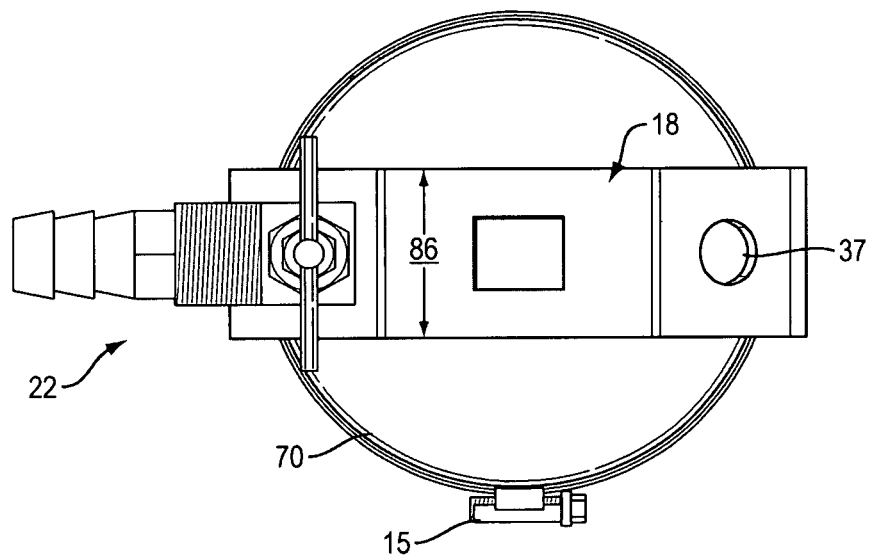
FIGS. 11A-11E are top down, one side, other side, bottom up, and perspective views of the present invention, respectively.
Figure 11B:
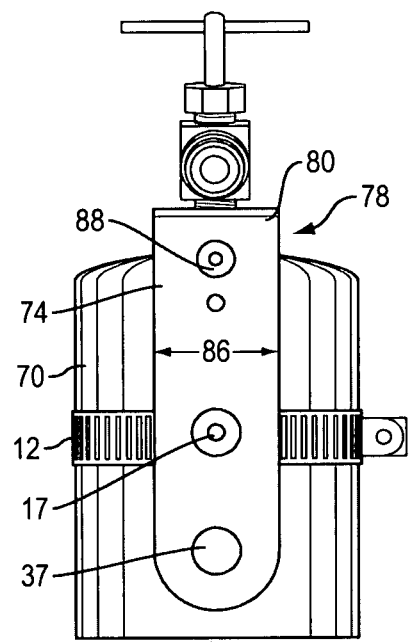
Figure 11C:
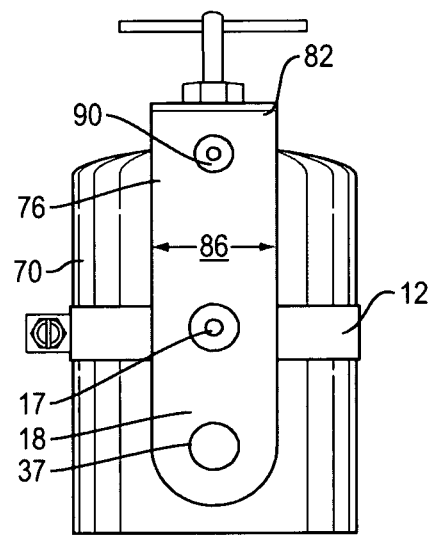
Figure 11D:
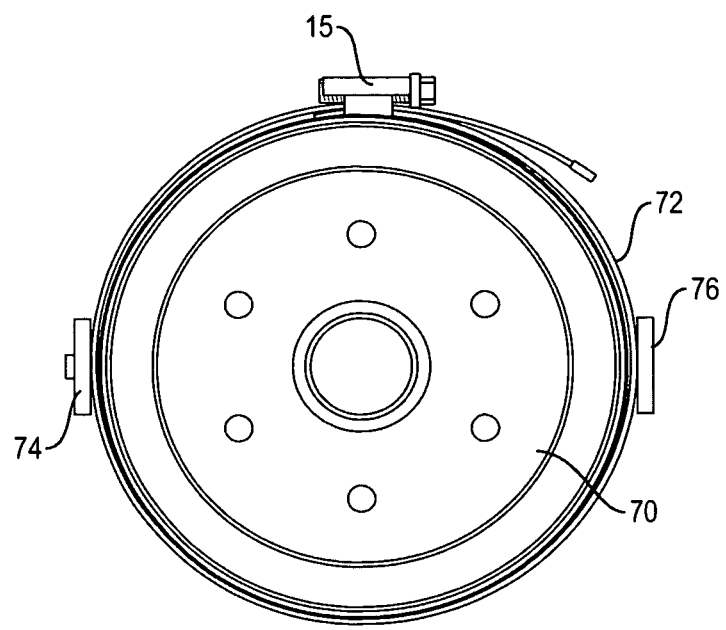
Figure 11E:
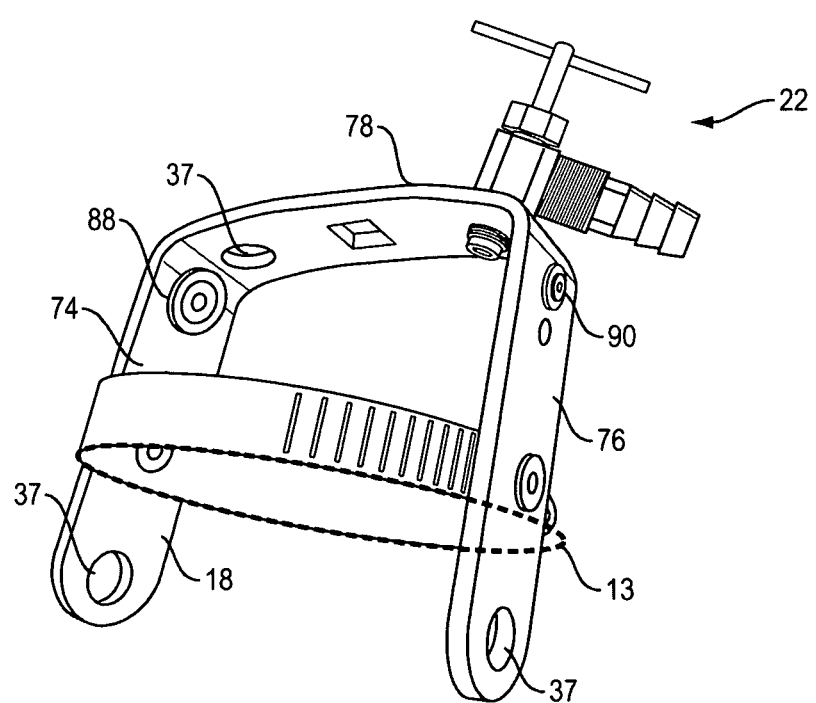

Another important feature of the bracket 18 shown in FIG. 11A is the socket opening 39, which is sized to allow a socket wrench (not shown) to be used to turn the bracket 18 and attached oil filter 70. Although the socket opening 39 is shown as a square opening, it may take many forms that allow the bracket 18 to be turned by a separate tool. For example, it may take the form of a slot in which a flat screw head may fit. It may also not be an opening but, rather, a raised area to which a socket may be attached and turned.

Accordingly, the socket opening 39 should not be seen as being limited to the opening shown in FIG. 11.

Figure 12:
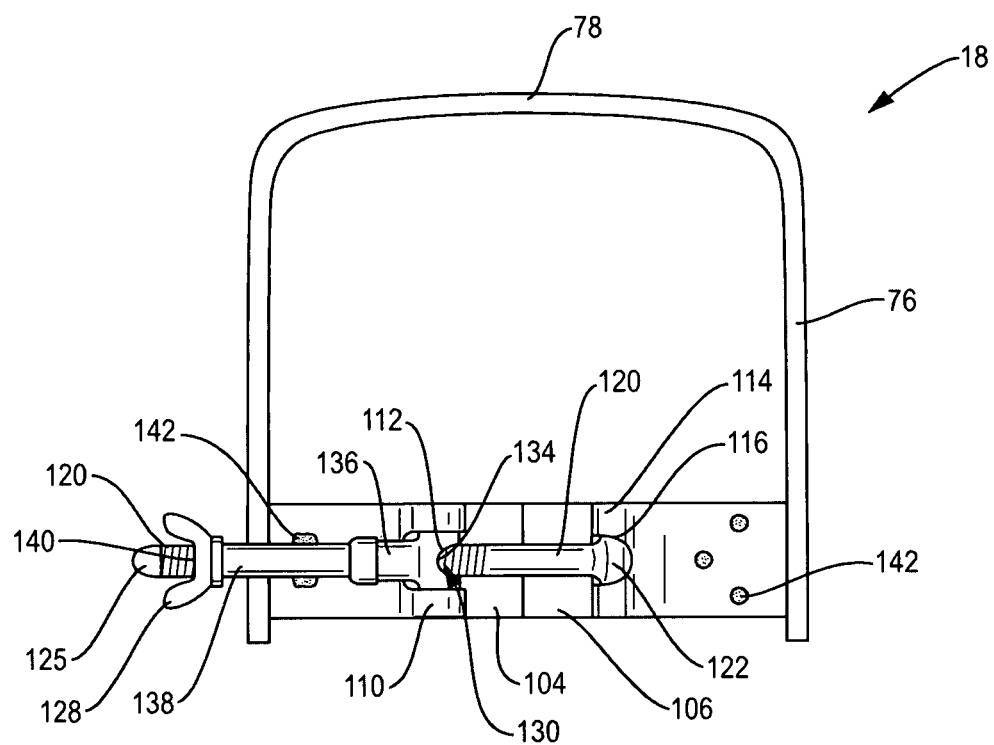
FIG. 12 is a side view of the present invention with the preferred ring clamp.
Figure 13A:
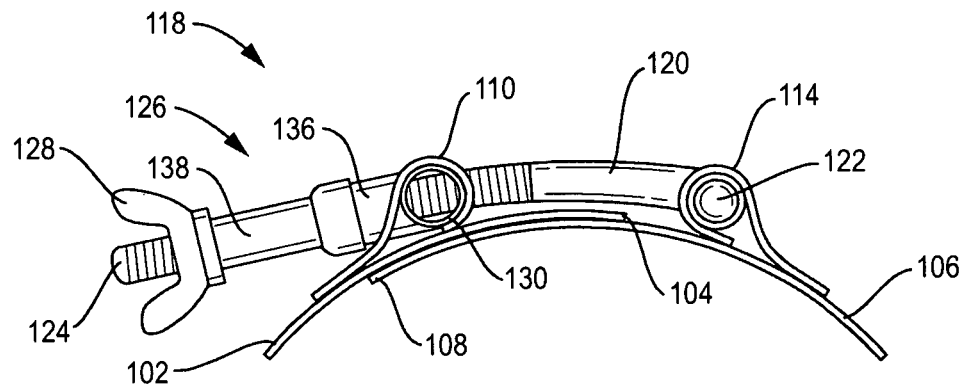
FIG. 13A is a top down view of the preferred ring clamp with a larger ring circumference.
Figure 13B:
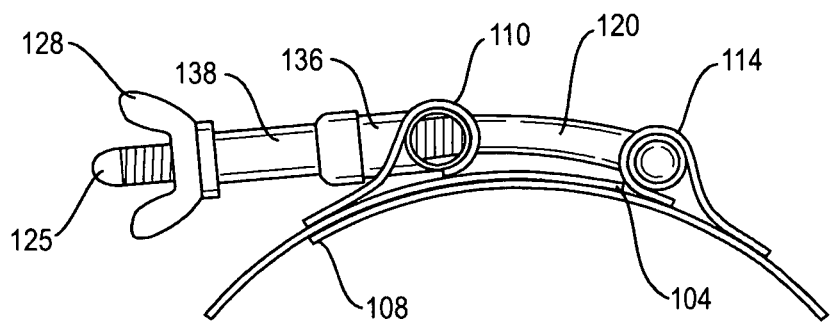
FIG. 13B is a top down view of the preferred ring clamp with a smaller ring circumference.
Figure 13C:
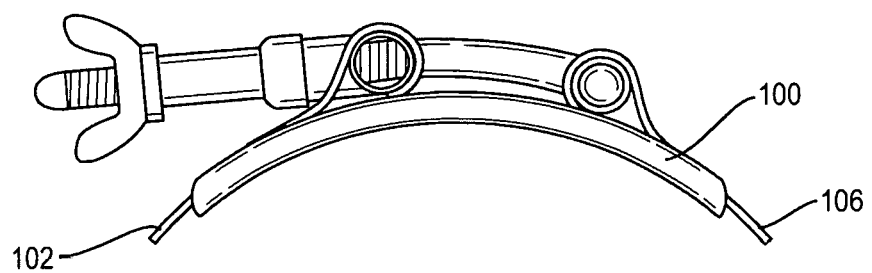
FIG. 13C is a top down view of the preferred ring clamp with an overlap lip.

Now referring to FIGS. 12 and 13A-13C, a preferred embodiment of ring clamp 15 is illustrated. In FIG. 12, ring clamp 15 is shown between left and right sides 74, 76 of bracket 18. Valve 22 and its attachments and features are omitted from this Figure for clarity, but understood to be a part of the fluid extractor device 10. Ring 12 includes outer overlap 102 and inner overlap 106 as shown most clearly in FIGS. 13A and 13B. Outer overlap 102 has outer overlap end 104. Inner overlap 106 has inner overlap end 108. As ring circumference 13 is adjusted to accommodate a larger oil filter, as shown in FIG. 13A, outer and inner overlaps 102, 106 overlap each other less and outer overlap end 104 and inner overlap end 108 are closer together. As ring circumference 13 is adjusted to accommodate a smaller oil filter, as shown in FIG. 13B, outer and inner overlaps 102, 106 overlap each other more and outer overlap end 104 and inner overlap end 108 are farther apart. As shown in FIG. 12, outer overlap end 104 is visible and disposed on top of inner overlap 106. Inner overlap 106 may include overlap lip 100. Lip 100 guides outer overlap 102 as inner and outer overlaps 106, 102 move with relation to one another. Lip 100 ensures that inner and outer overlaps 106, 102 do not become skewed from one another during adjustments.

Figure 14A:
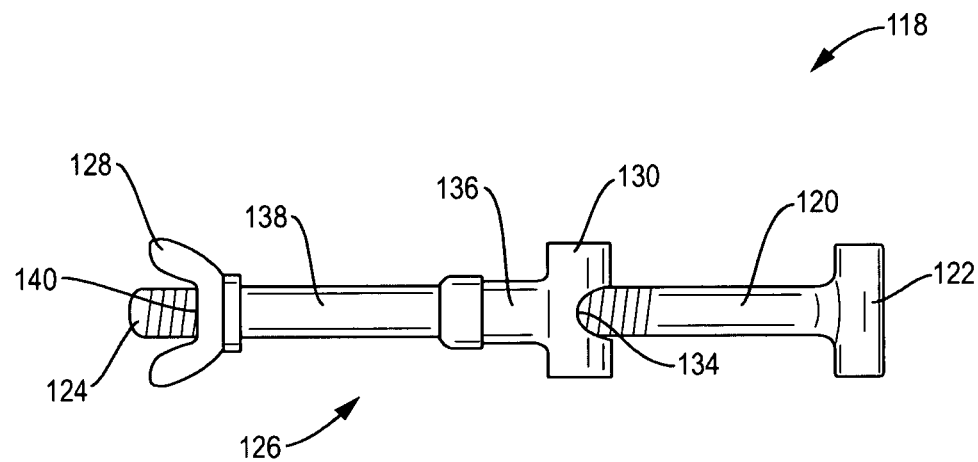
FIG. 14A is a side view of the adjuster of the preferred ring clamp.
Figure 14B:
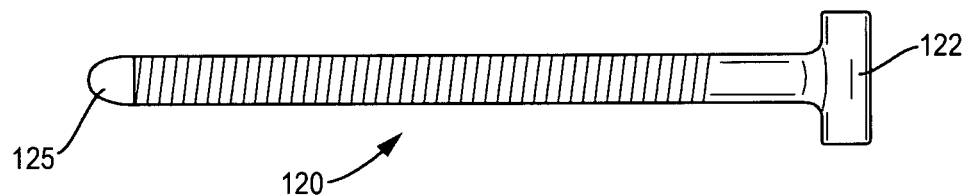
FIG. 14B is a side view of threaded piece of the adjuster of the preferred ring clamp.

Ring clamp 15 includes adjuster 118 that includes threaded piece 120 and sleeve 126. Threaded piece 120 is shown alone in FIG. 14B. Threaded piece 120 is designed to extend through sleeve 126 as shown in FIG. 14A. Threaded piece 120 may include threading along its entire length, as shown in FIG. 14B, or along only a portion extending from threaded piece end 124, as shown elsewhere. Sleeve 126 surrounds a sleeve threaded hollow, which is not shown, but is understood to run through the length of sleeve 126 on the inside of sleeve 126. Threaded piece 120 ends at one end with threaded piece T-bar 122 and at the other end with threaded piece end 124. Threaded piece end 124 may be uncovered, as shown in FIGS. 13A and 14A, or may include a cap 125, as shown in FIGS. 12, 13B, 13C, and 14B. Sleeve 126 ends at one end with sleeve T-bar 130 and at the other end with bolt 128. Bolt 128 is preferable a butterfly bolt, as shown, but may be any type of bolt commonly used in the art. Sleeve T-bar 130 includes hole 134. Bolt 128 includes bolt hole 140. The sleeve threaded hollow is exposed on either end by holes 134 and 140. Although holes 134 and 140 are not clearly shown, it is understood that threaded piece end 124 may enter sleeve threaded hollow through hole 134, screw all the way through sleeve 126, and exit sleeve threaded hollow through bolt hole 140. Sleeve 126 includes outer sleeve 136 and inner sleeve 138. Outer sleeve 126 ends in and is affixed to sleeve T-bar 130. Inner sleeve 138 ends in bolt 128. Inner sleeve 128 may move in and out of outer sleeve 126 as controlled by bolt 128. When bolt 128 is tightened so that bolt 128 moves down threaded piece 120, inner sleeve 128 moves into outer sleeve 126, and vice versa.

Sleeve T-bar 130 is held in place by outer overlap hook 110. Threaded piece T-bar 122 is held in place by inner overlap hook 114. Hooks 110, 114 are affixed to inner and outer overlaps 106, 102, respectively. This affixation may be by welding 142, as shown in FIG. 12, or by any other means commonly used in the art. Hooks 110, 114 face one another and curve up and out from inner and outer overlaps 106, 102, and then back around to come back in contact with inner and outer overlaps 106, 102. The curved portion allows T-bars 122, 130 to turn within the space, but otherwise remain stationary. This ability for the T-bars 122, 130 to turn accommodates the adjustments made by turning bolt 128.

Figure 15A:
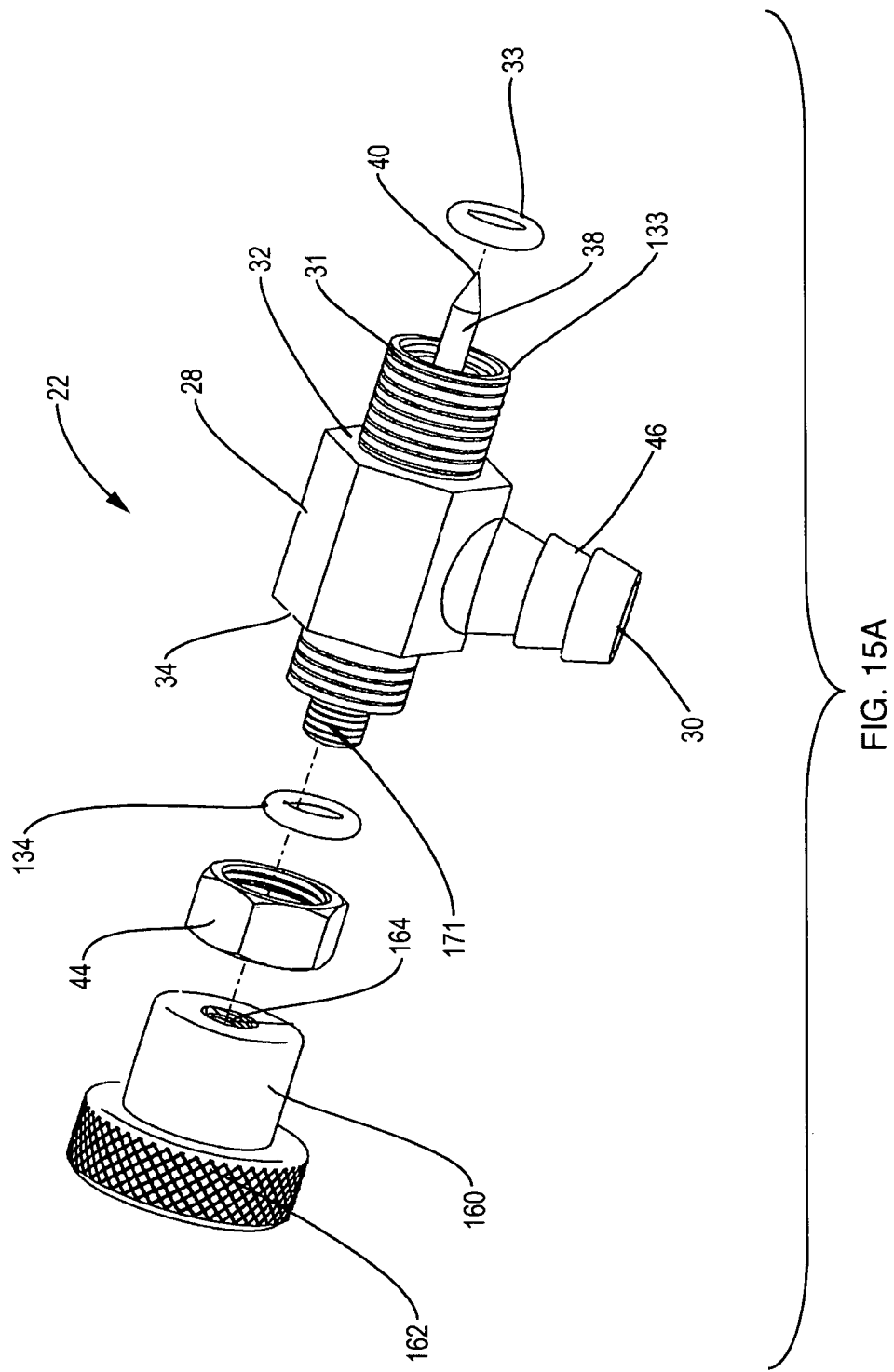
FIG. 15A is an assembly view of the preferred valve of the present invention.

Referring now to FIGS. 15A-15C, the preferred valve 22 is shown. Valve 22 has base 28 and vacuum extension 30 perpendicular to base 28. Base 28 has bracket side 32 that extends through bracket 18 and exposed side 34 out of which the threaded portion 171 of valve plug 138 extends. Bracket side 32 includes base bracket side threading 31 on the outside surface and cylindrical detent 133 on the inside surface that is dimensioned to capture compressible ring 33. Valve plug 138 is disposed within the hollow interior of base 28. Valve plug 138 includes a substantially cylindrical threaded portion 171 that extends from the exposed side 34 of the base 28 a plug portion 172 having a larger diameter intended to fit within and seal off a mating opening inside of the base 28 and a pin portion 174 having a threaded opening 173 dimensioned to accommodate the threaded end of pin 38. Pin 38 includes a pointed end 40 and threaded end, which is not visible in this view as it is within base 28. The preferred pin 38 is a made of stainless steel and is threaded at the threaded end to allow it to be secured to the valve plug 138 but to also be replaced if dulled or broken. The threaded portion 171 of the valve plug 138 extends out of the opening in the exposed side 34 of the base 34 and is sealed in place by compression nut 44, which threads onto the threaded portion of exposed side 34 and captures o-ring 134. The threaded portion mates with a threaded opening 164 in a knurled knob 160. The knurled knob includes a knurled surface 162, which makes it easier for a user to grasp and rotate the knob 160.

Although the present invention has been described in considerable detail with reference to certain preferred versions thereof, other versions would be readily apparent to those of ordinary skill in the art. For example, the present invention is readily adapted for removing fluids from other cylindrical objects and may be made larger or smaller to accommodate objects of other sizes. In addition, the present invention may be easily adapted to remove material from plastic or metal drums, from the bottom of bottles, or the like. Accordingly, the spirit and scope of the description should not be limited to the description of the preferred versions contained herein.

What is claimed is:

1. A fluid extractor device for extracting fluid from an oil filter, comprising:
    a ring having a ring circumference capable of fitting around an oil filter circumference of the oil filter and comprising a ring clamp disposed on said ring and capable of adjusting said ring circumference of said ring such that said ring is tightly held against the oil filter;
    a U-shaped bracket affixed to said ring;
        wherein said bracket comprises a left side, a right side, and a center side connecting tops of said left and right sides, and said left side, said right side, and said center side form a U-shape of said U-shaped bracket;
        wherein said bracket further comprises a distance between said left and right sides, a width, and at least one valve hole disposed through said bracket, wherein said at least one valve hole comprises:
            at least one valve hole disposed through said left side of said bracket;
            at least one valve hole disposed through said right side of said bracket; and
            at least one valve hole disposed through said center side of said bracket;
        wherein said left side is substantially parallel to said right side;

wherein said distance between said left and right sides is such that said ring fits within said distance;

wherein said ring is affixed to said left and right sides of said bracket; and wherein said width is wide enough to accommodate said affixation of said ring to said left and right sides;

a valve comprising:

a base comprising a bracket side and a pin side, wherein said at least one valve hole of said bracket is sized and dimensioned to accommodate said bracket side such that said valve and said bracket are capable of being held in place relative to one another;

a pin comprising a pointed end and a screw end, wherein:

said pin extends through said base with said screw end of said pin extending beyond said pin side of said base; and through turning said screw end of said pin, said pointed end of said pin is capable of being disposed entirely within said base and is capable of extending beyond said bracket side of said base; and a vacuum extension extending perpendicularly from said base and terminating in a vacuum aperture, wherein said vacuum extension is sized and dimensioned to securely attach a vacuum hose around said vacuum extension.

2. The fluid extractor device as claimed in claim 1, wherein said bracket side of said base of said valve of said fluid extractor device comprises base bracket side threading and each of said at least one valve hole of said bracket comprises corresponding valve threading such that said bracket side of said base of said valve is capable of being securely screwed into any of said at least one valve holes of said bracket.

3. The fluid extractor kit as claimed in claim 1, wherein said bracket further comprises a left buffer affixed to said left side of said bracket and a right buffer affixed to said right side of said bracket, wherein said right and left buffers extend slightly into said distance between said right and left sides so as to firmly hold the oil filter in place within said ring and said bracket.

\* \* \* \* \*